(12) United States Patent
Schwarz et al.

(10) Patent No.: US 7,242,698 B2
(45) Date of Patent: Jul. 10, 2007

(54) WAVELENGTH TUNABLE LASER WITH DISPERSIVE ELEMENT

(75) Inventors: Jochen Schwarz, Stuttgart (DE); Wolf Steffens, Herenberg (DE); Ulrich Kallmann, Tuebingen (DE); Bernd Nebendahl, Ditzengen (DE); Emmerich Mueller, Aidlingen (DE)

(73) Assignee: Agilent Technologies, Inc., Paol Alto, CA (US)

( * ) Notice: Subject to any disclaimer, the term of this patent is extended or adjusted under 35 U.S.C. 154(b) by 267 days.

(21) Appl. No.: 10/526,168

(22) PCT Filed: Aug. 28, 2002

(86) PCT No.: PCT/EP02/09582

§ 371 (c)(1),
(2), (4) Date: Feb. 25, 2005

(87) PCT Pub. No.: WO2004/021535

PCT Pub. Date: Mar. 11, 2004

(65) Prior Publication Data

US 2006/0007980 A1    Jan. 12, 2006

(51) Int. Cl.
*H01S 3/10*    (2006.01)
*H01S 3/08*    (2006.01)

(52) U.S. Cl. .......................... 372/20; 372/98
(58) Field of Classification Search .................... 372/20
See application file for complete search history.

(56) References Cited

U.S. PATENT DOCUMENTS 5,235,605 A    8/1993    Rines et al.
5,513,194 A    4/1996    Tamura et al.
5,970,079 A *  10/1999   Zavartsev et al. ............ 372/41
6,778,565 B2*  8/2004    Spuehler et al. .............. 372/25

FOREIGN PATENT DOCUMENTS

| DE | 19544897 | 6/1997 |
| DE | 19960765 | 11/2000 |
| EP | 0798825 | 10/1997 |
| WO | WO 9531023 | 1/1995 |

OTHER PUBLICATIONS

Szipocs R. et al, "Chirped multilayer coatings for broadband dispersion control in femtosecond lasers", Optical Society of America, vol. 19, No. 3, pp. 201-203.
International Search Report, May 23, 2003.

* cited by examiner

*Primary Examiner*—Armando Rodriguez

(57) ABSTRACT

A laser being tunable in wavelength includes a first reflecting unit and a second reflecting unit, both reflecting units being arranged to at least partially reflect an incident beam of electromagnetic radiation towards each other, an optical path of said beam of electromagnetic radiation within said cavity, which is defined in length by said first and second reflecting unit, a dispersive device, which is arranged, such that a portion of said optical path of said beam of electromagnetic radiation traverses through said dispersive device, wherein said dispersive device comprises a dispersive characteristic representing a functional dependence of an optical path length of said portion with respect to wavelength of said electromagnetic radiation, wherein said optical path length increases with an increasing wavelength of said electromagnetic radiation.

11 Claims, 5 Drawing Sheets

WAVELENGTH TUNABLE LASER WITH DISPERSIVE ELEMENT

This is the National Stage of International Application No. PCT/EP02/09582, filed 28 Aug. 2002.

BACKGROUND OF THE INVENTION

The present invention relates to wavelength tunable lasers, particularly to wavelength tunable lasers selecting resonance modes of electromagnetic radiation provided by an internal or external energy source.

Wavelength tunable lasers are playing an increasing role in the field of optical industry, particularly in the field of light generating or optical measurement devices.

SUMMARY OF THE INVENTION

It is an object of the present invention to provide an improved wavelength tunable laser. The object is solved by the features according to the independent claims. Preferred embodiments are provided by the dependent claims.

According to the present invention a wavelength tunable laser is provided comprising a first and a second cavity end mirror, both mirrors defining an optical path length of a beam of electromagnetic radiation, which is reflected by each mirror into a direction towards the respective other mirror. A cavity is defined in length by both mirrors forms a series of resonance modes out of a radiation spectrum. The wavelength of these modes depends on the optical path length within said cavity.

A dispersive device is arranged within the optical path of said beam. A portion of said path thus lies within said dispersive device. The dispersive device may additionally comprise an Anti-Reflex coating.

The dispersive device comprises a dispersion characteristic, which represents a functional dependence of a length of an optical path portion within said device with respect to the wavelength of said electromagnetic radiation, wherein said optical path length increases with an increasing wavelength of said electromagnetic radiation.

The dispersive device serves as a compensator to compensate all or some of the following dispersive effects: discrete mode selection in cavities, and/or dispersive characteristics of other elements in the cavity. The dispersive characteristics include the refractive index n, the first derivative of n with respect to wavelength lambda, $dn/d\lambda$, or the $2^{nd}$ derivative $d^2n/(d\lambda)^2$, or even higher derivatives.

According to preferred embodiments of the invention, there are at least two aspects to implement a dispersive device having this functional behavior:

1. using dispersive material having a refractive index, which increases with wavelength. This feature is also called anomalous dispersion. E.g., Silicon in the wavelength range 300 nm–370 nm. In general this behavior exists on the high energy side of an absorption peak so there is also high loss in this wavelength range.
2. using a reflective multi-layer structure, which by means of Bragg-reflection and in combination with a sequence of suitable layer thickness reflects an incident beam of electromagnetic radiation having a smaller wavelength by a layer, that is at or near the surface of said multi-layer structure, while a beam having a larger wavelength is reflected by a deeper layer. The optical path length of the electromagnetic radiation having a larger wavelength thus attains a larger value. To accomplish this, said layers are, e.g., provided with sequentially decreasing layer thickness, or equivalently, with increasing refractive indices. In this case normal dispersion material may be applied. This structure may also be realized in planar waveguides using etching technologies Examples of materials utilized to form such layers are: AlGaAs or AlGaInP epitactically grown on a GaAs substrate, InGaAsP epitactically grown on a InP substrate, AlGaN epitactically grown on a GaN substrate; semiconductor material such as Si or Ge deposited e.g. in a thermal evaporation step; semiconductor material structured as bulk material such as Si, GaAs, InP; alternating layers of dielectric materials such as $SiO_2$, TiO, $Ta_2O_5$, SiN; polymer material like PMMA; combinations of metals and polymers. It is to be understood, that the dispersive device is not restricted to the material composition as provided in the foregoing.

The first and second cavity end mirror can be of any reflective structure. E.g., a metallic or dielectric mirror, cleaved facet of a semiconductor chip with or without additional coating.
3. using an external cavity setup that uses a dispersing reflector that has a larger cavity length for larger wavelengths in such a way, that all wavelengths fulfill the resonance condition of the cavity.

In one aspect of the present invention the dispersion characteristic of the dispersive device within said cavity is designed, such that the cavity does not have discrete modes. Rather, it comprises a flat homogeneous transmission behavior in a certain wavelength range, i.e. all wavelengths within a certain wavelength range fulfill the resonance condition of the cavity.

A cavity comprising such a dispersive device may be used, e.g., in mode locked lasers (pulse lasers) such that locking of a broader wavelength range is possible.

According to a further aspect of the present invention, the dispersion characteristic of the dispersive device is designed to compensate totally or at least partially the dispersion characteristic of the cavity without said dispersive device, i.e. the sum of the characteristics of the other optical elements within the cavity. The compensation refers but is not limited to the refractive index n, the first derivative of n with respect to wavelength $\lambda$, $dn/d\lambda$, and $2^{nd}$ derivative $d^2n/(d\lambda)^2$ or even higher order derivatives.

Therefore, the dispersion characteristic is substantially opposite to a dispersion characteristic revealed by other optical components of the cavity. The dispersive device can have a length of the optical path of said beam, which increases with wavelength at least within a limited wavelength range. An absolute value of the optical path length of the dispersive device depends on the device extension, the actual path the beam takes through said device and the actual radiation wavelength considered.

Other optical components within the cavity such as the first and second cavity end mirrors, lenses, windows, gaseous material, solid material, in particular semiconductor material, beam splitters, etc. generally comprise a dispersion behavior, according to which an optical path length decreases with increasing wavelength of the electromagnetic radiation.

In case the geometrical length of the path that the beam takes from the first cavity end mirror towards the second cavity end mirror is fixed, the features according to this embodiment of the present invention result in a constant optical path length of the complete cavity including the dispersive device as a function of wavelength.

In practice, when designing a cavity according to this embodiment of the present invention, it is advantageous first to determine a dispersion characteristic of the cavity without the dispersive device, and then to form a dispersive device by applying materials and a structure to said device, which essentially displays the opposite dispersion characteristic with respect to the cavity. In one embodiment of the present invention, this may be accomplished by, e.g., a dispersion tailored photonic crystal.

According to a further embodiment of the present invention a wavelength tunable cavity is advantageously provided with the dispersive device. For this purpose the geometrical distance between the first and second cavity end mirror along the optical path of the beam, which may correspond to a linear or a redirected beam, can be varied in order to shift the series of resonance modes.

It is generally desired, to select one of these modes using a wavelength tunable filter. Since a resonance mode shifts in wavelength as a result of the cavity change, the wavelength filter is tuned in response to said cavity change in order to keep the resonance mode within the filter wavelength range.

The dispersive device implemented within the optical path of the beam of radiation compensates for the normal dispersion behavior of the other optical elements within the cavity. Otherwise, the normal dispersion behavior of these elements would inevitably result in a mode hop, when shifting the resonance modes towards larger or lower wavelengths. Therefore, the present invention advantageously extends the wavelength range available for performing a wavelength tuning without leading to a mode hop.

In a further embodiment the wavelength tunable cavity is provided with a laser source comprising a laser medium, preferably of semiconductor material, a back facet, which forms a first cavity end mirror, and a front surface, through which a beam is emitted towards the second cavity end mirror. Preferably, the cavity comprises an internal and an external cavity.

With respect to a wavelength tunable cavity, the present invention may be implemented as either one of a Littmann cavity, a Littrow cavity, a linear cavity or a ring cavity, but is not restricted to such cavities given. Rather, any wavelength tunable cavity comprising optical elements having a dispersion characteristic, which limits the tunable wavelength range can advantageously be provided with a dispersive device according to the present invention. The invention is not restricted to lasers, an implementation of wavelength tunable cavities in the field of fiber-interferometers is also possible.

BRIEF DESCRIPTION OF THE DRAWINGS

These and other objects, features, aspects and advantages of the present invention will become more apparent from the following detailed description of the present invention, when taken in conjunction with the accompanying drawings.

DETAILED DESCRIPTION OF EMBODIMENTS OF THE INVENTION

Figure 1A:
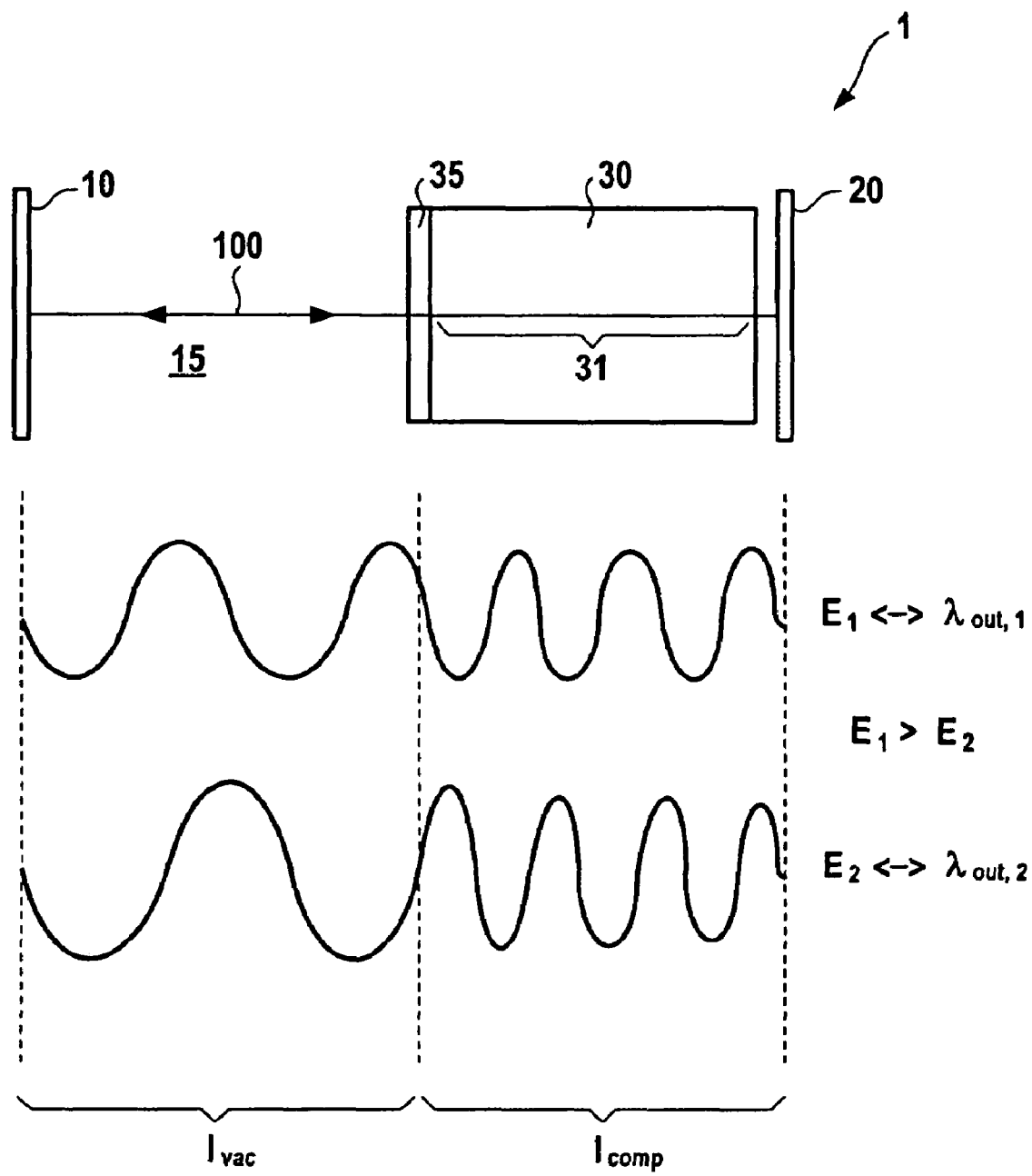
FIG. 1 displays the basic concept of a cavity according to a first aspect of the present invention with two cavity end mirrors and a dispersive device, the cavity having a same mode number m for different wavelengths (a), and a comparison of a simple Fabry-Perot cavity without and with a dispersive device illustrating a resulting transmission spectrum (b)

A first embodiment of the present invention is shown in FIG. 1a. A cavity 1 is defined by a first cavity end mirror 10, a second cavity end mirror 20, both mirrors facing each other, such that a beam of an electromagnetic radiation 100 traverses between them by means of direct reflection. The electromagnetic radiation may, e.g., be in-coupled through a semitransparent first or second cavity end mirror 10, 20.

Cavity 1 comprises an optical path length defined by the fixed distance between the first and second cavity end mirrors 10, 20. It corresponds to a sum of the individual optical path length represented by contributions from the first cavity end mirror 10, a gaseous medium 15 and the second cavity end mirror 20.

Within the optical path, that the beam of electromagnetic radiation 100 takes from mirror to mirror, a dispersive device 30 is placed having a dispersion characteristic, which is opposite to the dispersion characteristic of the first and second cavity end mirrors 10, 20 and the gaseous medium 15. I.e., the optical path length of a portion 31 of the optical path within said dispersive device 30 increases with increasing wavelength. The dispersive device 30 also contributes to the total optical path length, which depends on the wavelength according to the dispersion characteristic.

Dispersive device 30 comprises a reflective multi-layer structure mounted on the second cavity end mirror 20, which also has an AR-coating 35. It comprises a specific dispersion characteristic, the effect of which is shown in the two resonance mode curves displayed in the bottom section of FIG. 1a. The upper curve corresponds to a first vacuum wavelength, or spectral energy $E_1$ respectively, while the bottom curve corresponds to a second spectral energy $E_2$, whereby the first spectral energy is larger than the second spectral energy. However, both curves have the same mode number (m=10). A decrease in vacuum wavelength and thus a step towards a lower mode is compensated by a decrease in optical path length due to the dispersive device 30. As a result a slightly increased spectral energy is still represented by the same mode number.

For this embodiment a desired dispersion curve that has to be accomplished by the dispersive device 30 can be calculated from equations:

$$m \cdot \lambda_1 = I_{vac} + I_{comp} \cdot n(\lambda_1)$$

$$m \cdot \lambda_2 = I_{vac} + I_{comp} \cdot n(\lambda_2),$$

where $I_{vac}$ and $I_{comp}$ are the geometrical path lengths through vacuum and the dispersive device 30, respectively. From the condition $\lambda_1 < \lambda_2$, it follows that $n(\lambda_1) < n(\lambda_2)$ and thus the optical path length within the dispersive device 30 at a wavelength $\lambda_1$ is smaller than at a wavelength $\lambda_2$.

Figure 1B:
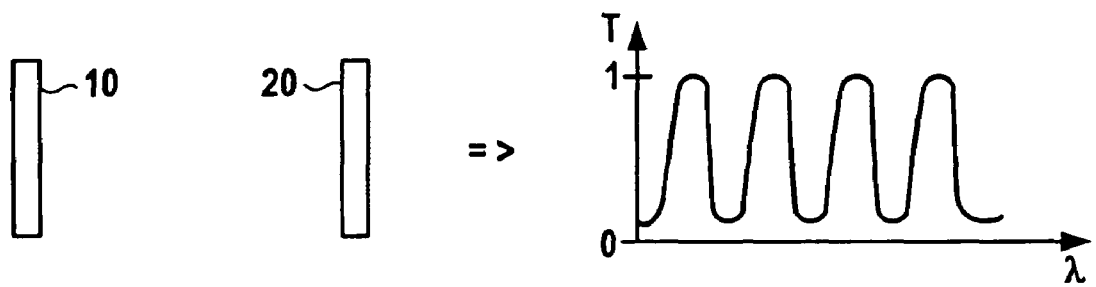
Figure 1B:
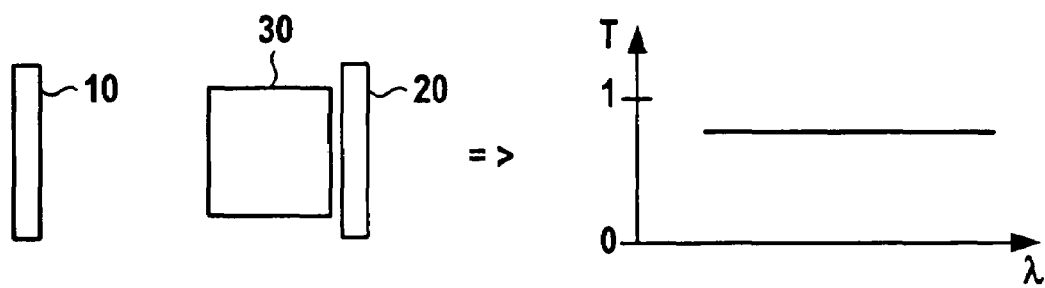

A comparison of a simple Fabry-Perot cavity without and with a dispersive device illustrating a resulting transmission T as a function of wavelength λ is shown in FIG. 1b. The upper diagram displays the prior art status, where a set of resonance modes develops within the cavity. However, in the lower diagram representing the case including a dispersive device 30 all wavelengths λ within a certain wavelength range fulfill the resonance condition, which yields a flat transmission spectrum. The flat spectrum of transmission T in this example corresponds to just one mode (m=10).

Figure 2:
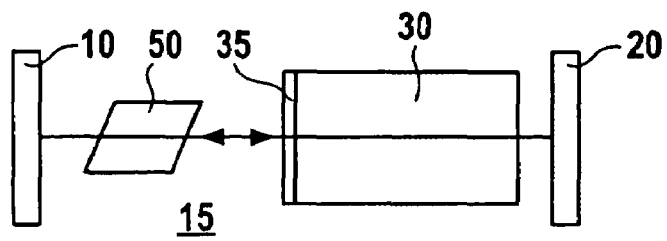
FIG. 2 shows a gain chip with tilted facets for low internal reflections being incorporated into a cavity having a dispersive device.

A cavity comprising a gain medium or an amplifier is shown in FIG. 2. Here, the dispersive device 30 is used with advantage in a ripple free ASE-source (ASE=amplified spontaneous emission), which is realized by inclined facets of the gain chip 50 with respect to the light beam 100.

Figure 3:
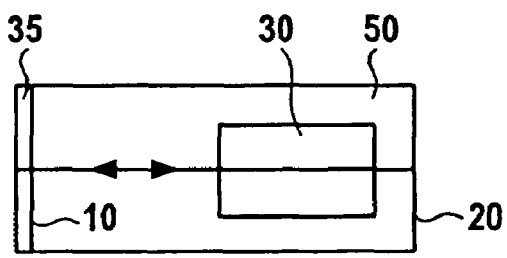
FIG. 3 shows displays an embodiment with the dispersive device being incorporated into the gain material.

A cavity having a dispersive device 30 for mode compensation integrated within a gain chip is displayed in FIG. 3. The integrated usage of a dispersive device 30 becomes particularly advantageous in combination with a linear optical amplifier (LSOA), when a flat transmission spectrum is to be generated by means of the cavity.

Figure 4:
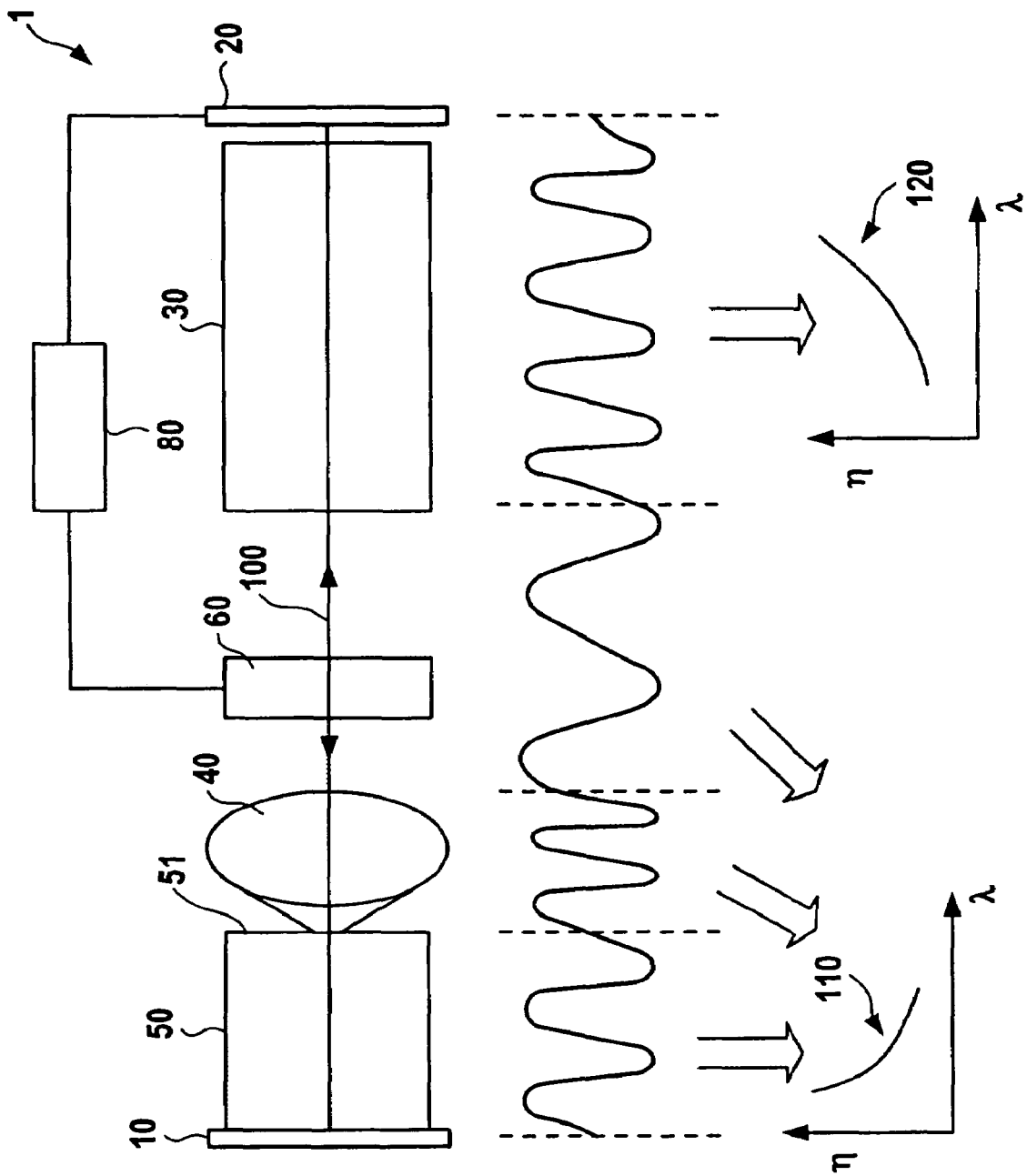
FIG. 4 displays a wavelength tunable laser having an external linear cavity with a dispersive device according to the present invention, FIG. 5 displays a wavelength tunable laser having an external Littmann cavity with a dispersive device mounted on the second cavity end mirror.

A further embodiment of a cavity according to the present invention is shown in FIG. 4. Cavity end mirrors 10 and 20 define an optical path having a length within a linear cavity laser source. A gain medium 50 having a front surface 51 and a back facet, which is identical to the first cavity end mirror 10, emits a beam 100 of electromagnetic radiation through a lens 40 towards the second cavity end mirror 20. Lens 40 serves for collimating the light beam emitted from the laser source along said optical path.

The cavity 1 additionally comprises a wavelength tunable filter 60. It is connected with the movable second cavity end mirror 20 via a control unit 80. A shift of the movable second cavity end mirror 20 results in a wavelength shift a multiple of resonance modes within cavity 1. By means of control unit 80, said wavelength tunable filter 60 is adapted in its filter wavelength range, such that this range co-moves with a desired resonance mode.

Some optical elements of the cavity, e.g., the gain medium 50, which is a semiconductor chip, the lens 40, the wavelength tuning filter 60, etc. display a dispersion characteristic 110, which can be seen in the bottom left section of FIG. 4. In the schematic representation of a diagram the refractive index n is given as a monotonically decreasing function of wavelength λ.

A dispersion device 30 is supplied within cavity 1 that has a dispersion characteristic 120 displayed in the bottom right section of FIG. 4. Here, the refractive index n is a monotonically increasing function of wavelength λ. The dispersion characteristic 120 of said dispersion device 30 is designed to compensate the dispersion characteristic 110 of said other optical elements 10, 20, 40, 50, 60 within said cavity 1. Weighting the refractive index with a geometrical length of said device along said optical path of said beam determines the actual optical path length, respectively.

Accordingly, using the cavity 1 of this embodiment, a difference in optical path length due to optical elements such as the lens 40, the laser medium 50, the wavelength tunable filter 60, etc. when scanning through a resonance mode wavelength by means of actuating the second cavity end mirror can be outweighed by a corresponding negative difference in optical path length due to a dispersive device 30 having an appropriate dispersion characteristic.

Figure 5:
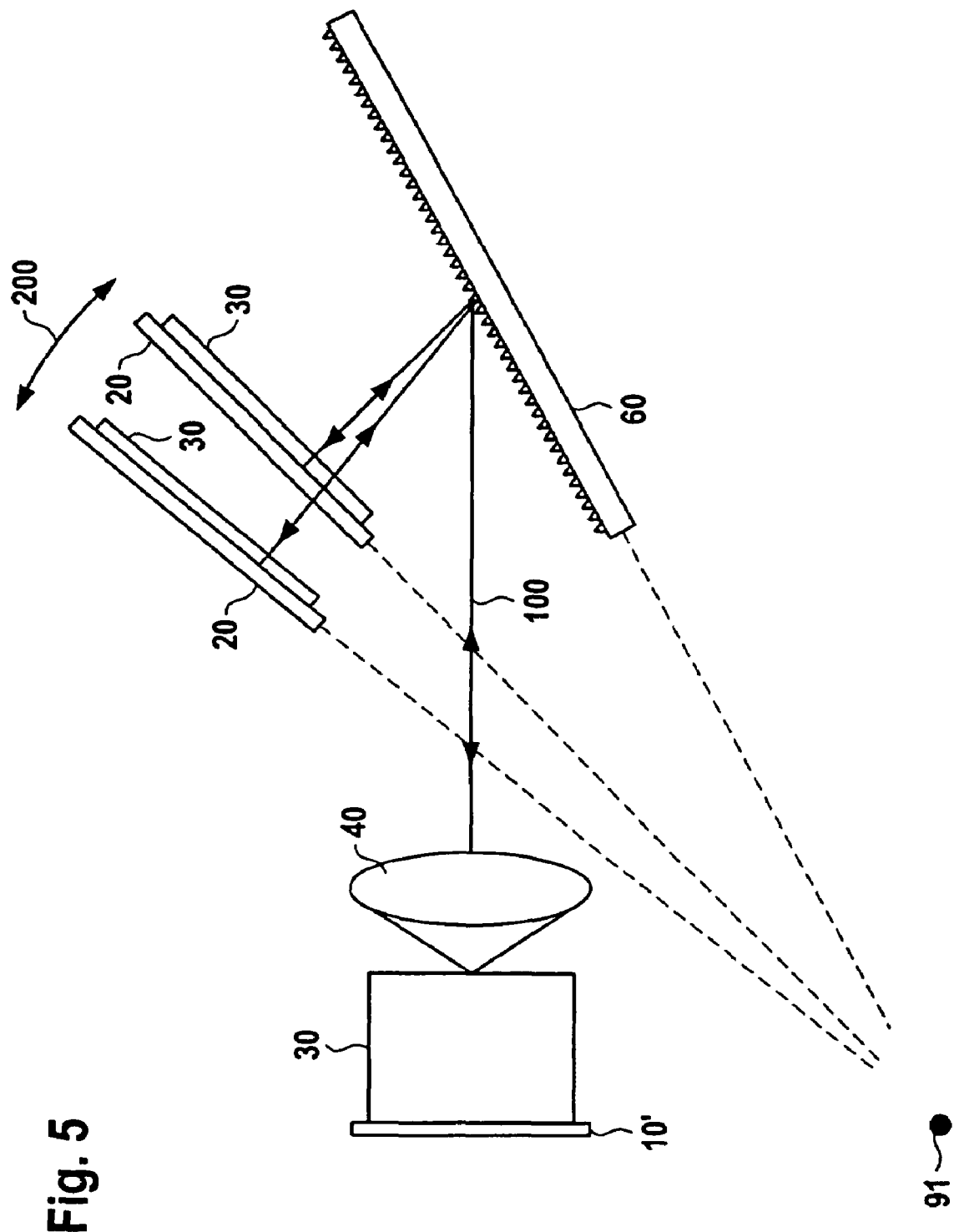

A third embodiment of the present invention is shown in FIG. 5, where a Littmann cavity is displayed. A first and second cavity end mirror define a length of an optical path of a cavity, in which an inclined grating is placed as a tunable wavelength filter. The second cavity end mirror is movable in a direction of rotation 200 about a pivot point 91, which is defined as an intersection between a line drawn as an extension from the grating 60, the mirror 20 and the back facet, which is identical to the first cavity end mirror 10. The cavity also comprises a laser medium 50 and a lens 40 for collimating a beam 100 emitted from said laser medium 50.

A dispersive device 30 is mounted as a reflective multi-layer on the second cavity end mirror. As in the previous embodiment its dispersion characteristic 120 is designed to compensate the dispersion characteristic 110 of other optical elements. Advantageously, by realizing a dispersion-free cavity a pivot point 91, which has a stable position within a wavelength range of larger than 400 nm, becomes possible as compared to about 150 nm wavelength ranges of dispersion limited systems.

In this third embodiment the dispersion compensating device may be placed at any part of the optical beam 100.

In a further embodiment a dispersion device 30 has a controllable dispersion characteristic, e.g., by means of mechanical pressure or electrically by means of a piezo-element. For example, the thickness of single layers of a reflective multi-layer can be influenced in order to attain a desired dispersion characteristic.

Figure 6:
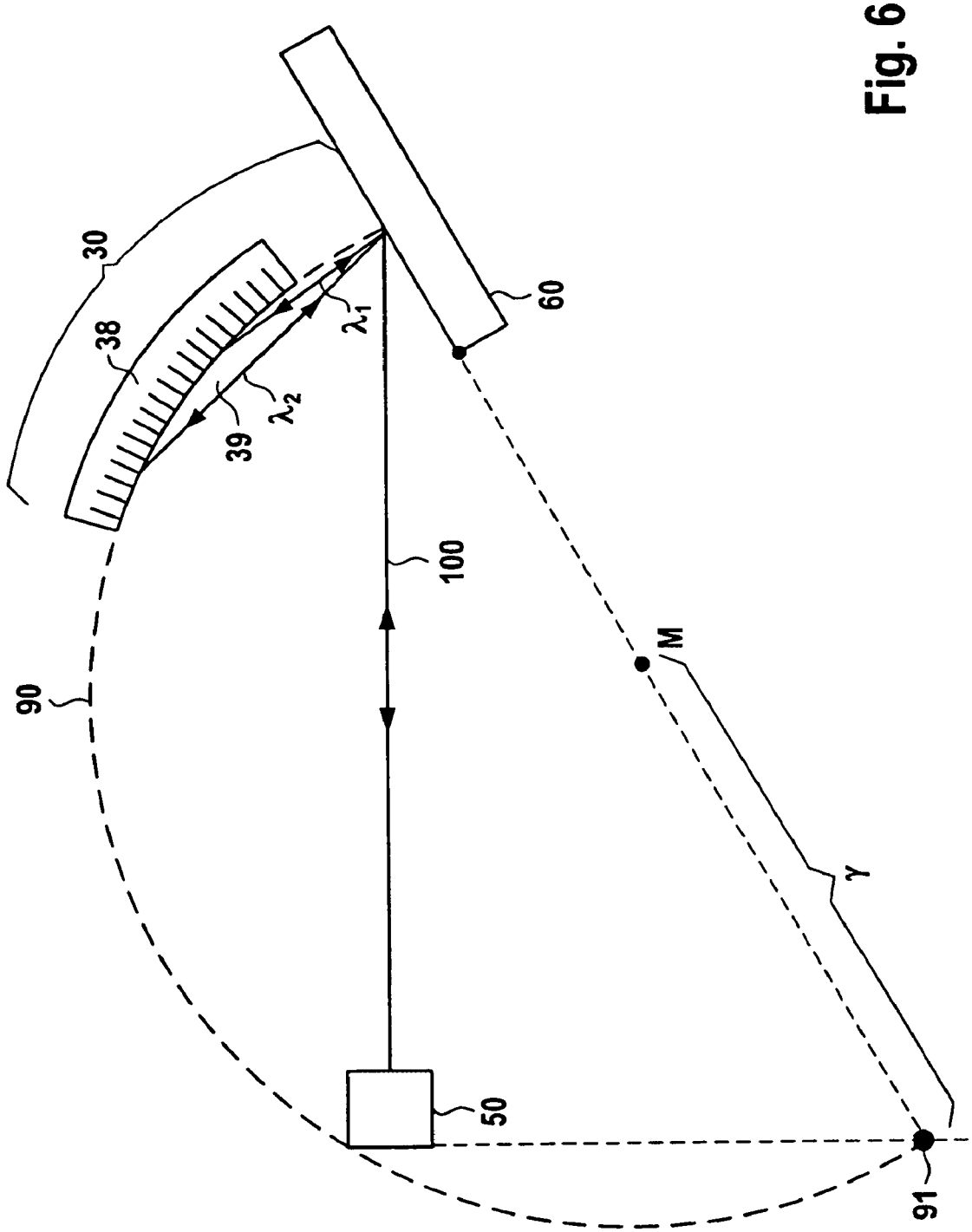
FIG. 6 displays an external cavity setup that fulfills the resonant condition for all wavelengths that hit the curved reflector. The curved reflector features a chirped grating on its surface that reflects different wavelengths $\lambda_1$, $\lambda_2$ in such a way that their direction is reversed.

A still further embodiment of an external cavity setup that uses a dispersing reflector, which has a larger cavity length for larger wavelengths in such a way, that all wavelengths fulfill the resonance condition of the cavity, is given by the arrangement shown in FIG. 6. The configuration is of a Littmann-type. There, a dispersive device 30 is realized by a chirped grating. It reflects the light beam 100 redirected by the wavelength filter 60, which is also represented by a grating.

The effect of the grating 60 is that portions of the light beam having differing wavelength are redirected, i.e. diffracted, under different angles towards the dispersive device 30. The grating of the dispersive device 30 is chirped or curved, such that it forms a surface of a sphere 90 having a radius r, which is half the distance between the pivot point 91 of the cavity and the intersection of the light beam 100 with the filter grating 60, wherein the midpoint M of the sphere 90 is positioned at the centre on a line connecting the filter grating 60 and the pivot point 91. By this configuration portions of the diffracted light having larger wavelengths $\lambda_2$ are diffracted with a larger angle than portions having smaller wavelengths $\lambda_1$. As a result the path between the filter grating 60 and the dispersive device grating 38 is longer for larger wavelengths. The dispersive device 30 in this embodiment consists of the chirped grating 39 and the space 38 between both gratings.

While the invention has been shown and is worked out in detail, the foregoing description is in all aspects illustrative and not restrictive. It is therefore understood, that numerous modifications and variations can be devised without departing from the scope of the invention.

The invention claimed is:

1. A laser being tunable in wavelength, comprising:
a first reflecting unit and a second reflecting unit, both reflecting units being arranged to at least partially reflect an incident beam of electromagnetic radiation towards each other,
an optical path of said beam of electromagnetic radiation within a cavity defined in length by said first and second reflecting units,
a dispersive device arranged such that a portion of said optical path of said beam of electromagnetic radiation traverses through said dispersive device,
wherein said dispersive device comprises a dispersive characteristic representing a functional dependence of an optical path length of said portion with respect to wavelength of said electromagnetic radiation, wherein said optical path length increases with an increasing wavelength of said electromagnetic radiation, and a gain medium for generating said electromagnetic radiation, said gain medium comprising a back facet, which is identical to said first reflecting unit, and a front surface, said gain medium emitting said beam through said front surface towards said second reflecting unit.

2. The laser being tunable in wavelength according to claim 1,
wherein either one of said gain medium or said second reflecting unit is movable in the direction of the optical path of said beam for adjusting said optical path length of said cavity to said selected wavelength range provided by said wavelength tunable filter.

3. The laser being tunable in wavelength according to claim 1, comprising at least one of the features:
said gain medium is a linear source optical amplifier;
said dispersive device is integrated within said gain medium.

4. A laser being tunable in wavelength, comprising:
a first reflecting unit and a second reflecting unit, both reflecting units being arranged to at least partially reflect an incident beam of electromagnetic radiation towards each other,
an optical path of said beam of electromagnetic radiation within a cavity defined in length by said first and second reflecting units,
a dispersive device arranged such that a portion of said optical path of said beam of electromagnetic radiation traverses through said dispersive device,
wherein said dispersive device comprises a dispersive characteristic representing a functional dependence of an optical path length of said portion with respect to wavelength of said electromagnetic radiation, wherein said optical path length increases with an increasing wavelength of said electromagnetic radiation, and
a wavelength tunable filter for selecting a wavelength range of a spectral distribution of said electromagnetic radiation comprising one resonance mode out of the set of resonance modes of said cavity.

5. The laser being tunable in wavelength according to claim 4,
wherein said functional dependence of said dispersive characteristic is designed to admit exactly one single mode of electromagnetic radiation to develop within said cavity.

6. The laser being tunable in wavelength according to claim 4,
wherein said functional dependence of said dispersive characteristic is designed such that said optical path length within said cavity is the same for any two different wavelengths of said electromagnetic radiation at least within a limited wavelength range.

7. The laser being tunable in wavelength according to claim 4,
wherein said dispersive device includes at least a part of said second reflecting unit.

8. The laser being tunable in wavelength according to claim 4,
further comprising a lens for collimating said beam emitted from said gain medium along said optical path towards said second reflecting unit.

9. The laser being tunable in wavelength according to claim 8,
wherein said dispersive device includes at least a part of said lens.

10. The laser being tunable in wavelength according to claim 4,
wherein said wavelength tunable filter comprises a grating for diffracting and redirecting said beam of electromagnetic radiation, the cavity being either one of a Littrow cavity or a Littmann cavity.

11. The laser being tunable in wavelength according to claim 4,
wherein said dispersive device comprises one or more materials of the group comprising:
semiconductor material epitactically grown on a substrate material, said semiconductor material and said substrate material being either combination of: AlGaAs and GaAs, AlGaInP and GaAs, InGaAsP and InP, or AlGaN and GaN, respectively,
a semiconductor material deposited on a substrate material in a vapor deposition step, said semiconductor material being one of a group comprising: Si, Ge,
a semiconductor material structured as bulk material being one of Si, GaAs, and InP,
a dielectric material being of $SiO_2$, TiO, $Ta_2O_5$, SiN,
a polymer material of a group comprising PMMA.

* * * * *